United States Patent [19]

Feuerman

[11] 4,133,847
[45] Jan. 9, 1979

[54] VAPORIZED FUEL FOR INTERNAL COMBUSTION ENGINE AND METHOD AND APPARATUS FOR PRODUCING SAME

[76] Inventor: Arnold I. Feuerman, 5179 Corners Dr., West Bloomfield, Mich. 48033

[21] Appl. No.: 726,178

[22] Filed: Sep. 24, 1976

Related U.S. Application Data

[62] Division of Ser. No. 553,566, Feb. 27, 1975, Pat. No. 4,011,843.

[51] Int. Cl.² .................................... F02B 51/04
[52] U.S. Cl. .................................. 261/18 A; 44/51;
   123/25 B; 123/25 E; 123/3; 123/DIG. 12;
   204/59 R; 204/168; 204/172
[58] Field of Search .............. 123/3, DIG. 12, 119 E,
   123/25 E, 25 R, 25 C; 261/18 A; 44/51; 204/59 R, 168, 172

[56] References Cited

U.S. PATENT DOCUMENTS

| 1,333,837 | 3/1920 | Csauje | 123/119 E |
|---|---|---|---|
| 1,379,077 | 5/1921 | Blumenberg | 123/DIG. 12 |
| 2,006,676 | 7/1935 | Garrett | 123/DIG. 12 |
| 2,656,824 | 10/1953 | Deuaux | 123/119 E |
| 3,556,976 | 1/1971 | Ishibashi | 204/172 |
| 3,761,062 | 9/1973 | King | 123/119 E |
| 3,818,876 | 6/1974 | Voogd | 123/25 R |

Primary Examiner—Ira S. Lazarus
Attorney, Agent, or Firm—Krass & Young

[57] ABSTRACT

An automobile engine is fueled with a mixture of air and a vapor derived by passing electric current through an electrolytically conductive emulsion of gasoline and water. Specific compositions of the conductive emulsions are disclosed as are unique designs for vaporizers for the fuel.

1 Claim, 5 Drawing Figures

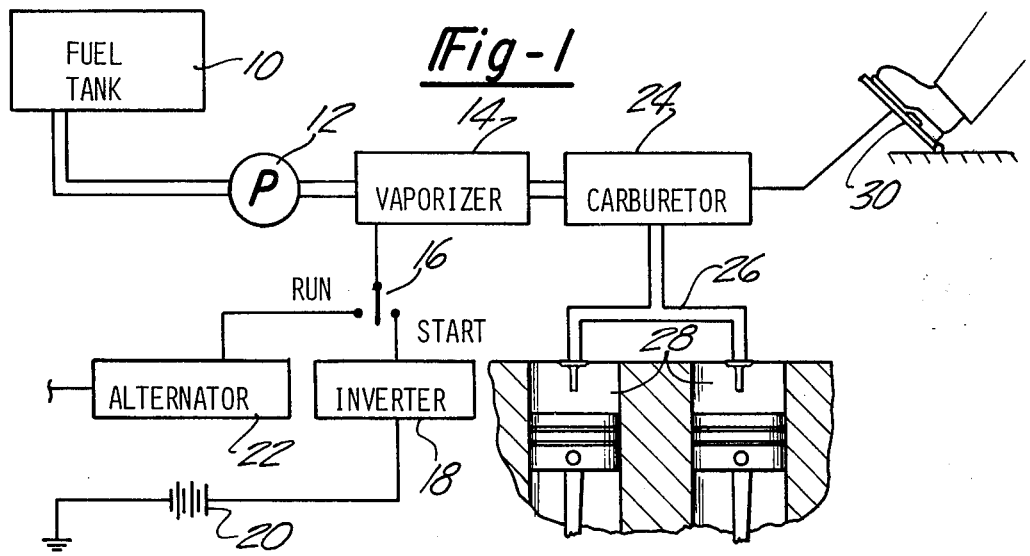
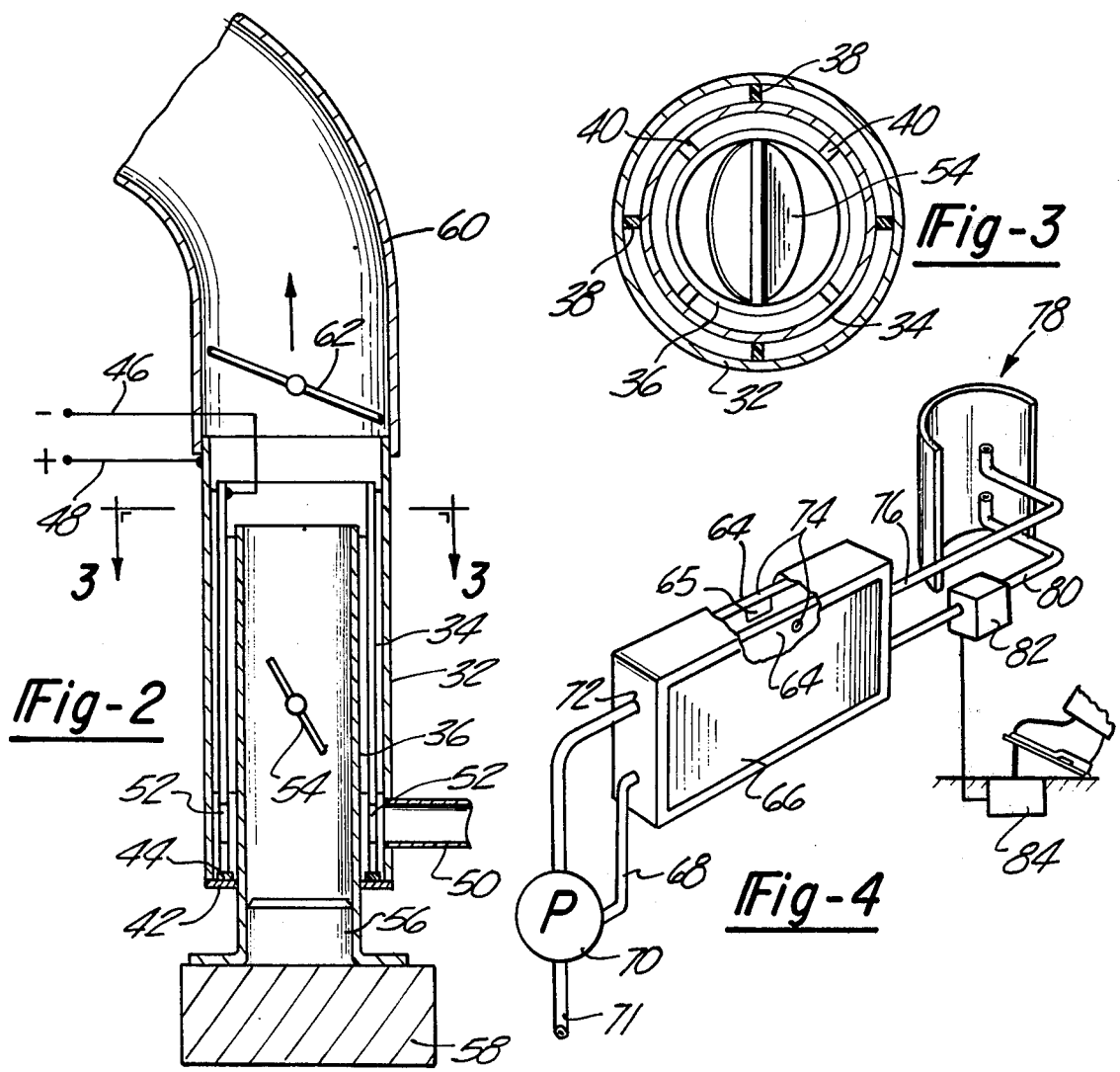

VAPORIZED FUEL FOR INTERNAL COMBUSTION ENGINE AND METHOD AND APPARATUS FOR PRODUCING SAME

This is a division of application Ser. No. 553,566, filed Feb. 27, 1975, now U.S. Pat. No. 4,011,843.

BACKGROUND OF THE INVENTION

1. Field of the Invention

This invention relates to the method of and apparatus for fueling an internal combustion engine with a vapor derived from a water-hydrocarbon emulsion, to electrolytically conductive emulsions useful for producing the vapor, and to vaporizers for electrolytically producing the vapor fuel from the emulsions.

2. Related Applications

My copending patent application U.S. Ser. No. 475,645, filed June 3, 1974 entitled "Vaporization Means and Method" now abandoned discloses a vaporizer useful in connection with the present invention. My copending patent application U.S. Ser. No. 544,145, filed Jan. 27, 1975 entitled "Gasoline-Water Emulsion" discloses a water-hydrocarbon emulsion system useful with the present invention.

3. Prior Art

Hydrocarbon fueled internal combustion engines are produced in large numbers and have been the subject of intensive research and development over many years, but they all exhibit well recognized shortcomings in certain aspects of their performance. One difficulty derives from the fact that the fuel/air ratio required to produce reliable ignition fills the combustion chamber with substantially more fuel than can be consumed during the ensuing explosion. The unburned hydrocarbons substantially lower the fuel efficiency of the engine, represent a substantial pollution factor in the exhaust, and tend to adhere to the walls of the combustion chamber, causing predetonation. If the fuel/air ratio is lowered to the point where the entire fuel charge is consumed during the explosion it is difficult to sustain reliable ignition of the charge.

The liquid hydrocarbon, typically gasoline, is not itself explosive; rather, only the vapor derived from the liquid is explosive. Since the vaporization process is exothermic, past efforts have been made to warm the fuel charge before it is admitted to the combustion cylinders, in order to hasten the vaporization.

A variety of heat exchangers which warm the charge with the combustion exhaust products have been proposed as well as various electric resistant heaters. In most modern carburetors a "hot spot" is provided which is heated with the exhaust gas. Also, various forms of "atomizers" have been proposed to subdivide the fuel into droplet form, thereby increasing the surface area of a given fluid quantity to hasten its varporization.

While all of these devices have some utility, the fact remains that in modern automotive engines much of the fuel is still in liquid form at the start of the combustion chamber explosion despite the fact that both the fuel economy of the engine and the cleanliness of its exhaust would be improved if the charge were in pure vapor form.

Another manner in which the efficiency of an internal combustion engine may be improved is by the mixture of water vapor with the intake fuel charge. The latent heat of vaporization of the water vapor absorbs some of the heat energy of the explosion and thus slows the combustion process. This decreases the tendency toward pre-ignition and allows the use of a lower octane fuel for given engine compression ratio. A variety of arrangements have been proposed for injecting water vapor into the combustion chamber with the fuel charge. The use of a water-fuel emulsion to provide water vapor in the combustion chamber has also been proposed but despite extensive development this technique has not been applied to any substantial commercial use.

SUMMARY OF THE INVENTION

The present invention broadly contemplates achieving the advantages provided by a vaporized fuel charge containing water vapor through use of a unique liquid fuel and a novel arrangement for vaporizing that fuel to achieve a vapor fuel that may be provided directly to the combustion chamber.

The vapor introduced into the combustion chamber in the present invention is derived by passing electric current through a water-hydrocarbon emulsion containing appropriate electrolytes. The resulting vapor includes the vapor from the hydrocarbon, water vapor, and may also contain some proportions of molecular hydrogen and oxygen resulting from the electrolytic decomposition of the water and hydrocarbons. This is not a fluid mist formed of droplets as are the outputs of prior art devices but is in true gaseous form.

When this vapor charge is mixed with air it is readily ignitable at fuel/air ratios substantially below those at which conventional fuel/air mixtures may be ignited, both because of its vapor nature and the presence of molecular oxygen and hydrogen in the vapor.

Engines fueled by vapor formed in accordance with the present invention attain higher fuel efficiencies and emit lower proportions of noxious combustion products than do conventionally fueled engines. A prototype vehicle embodying the present invention obtained more miles per gallon using the water-fuel emulsion of the present invention than it did employing the same quantities of plain gasoline.

The passage of current through the liquid fuel to produce vapor is achieved using a vaporizer of special construction employing closely spaced electrodes which extend into a body of the liquid fuel and draw a small amount of a liquid upward between the electrodes by virtue of their surface attraction for the fuel, which is akin to that produced in a capillary tube. Most of the current flow is through this small volume of fluid, quickly vaporizing it without any heating of the bulk of the fluid. The vaporizer is highly efficient in terms of its utilization of electricity and the current can readily be adjusted to control the rate of vapor generation in response to the engine's fuel requirements.

The electric current used with the vaporizer of the present invention may be either alternating current or direct current. The direct current is believed to cause a higher degree of disassociation of the water than AC but to require substantially higher currents. The energy used in disassociating the water is recovered in the burning of the resulting hydrogen in the combustion chambers.

I have found that conventional hydrocarbon fuels such as gasoline cannot be vaporized even with the addition of electrolytes, since these electrolytes do not homogeneously mix with the gasoline. Neither can the water-hydrocarbon emulsions known to the prior art be vaporized. However, I have discovered that the addition of appropriate electrolytes to certain water-hydrocarbon emulsions will produce liquid fuel that can be vaporized through the passage of electric current to produce vapor charges containing both hydrocarbons and water. The particular composition of liquid fuel disclosed subsequently, broadly consisting of water-hydrocarbon emulsions with added electrolyte, have proven highly stable over a wide range of temperature conditions and are simple to form using conventional mixing equipment.

The water-hydrocarbon emulsion used with the invention preferably contains not more than about one-third by volume of water. I have determined that at least about 2% to 3% by volume of water is required in the emulsion to attain a vaporizable liquid. The emulsion is achieved through use of relatively small quantities of surfactants. Within the range of surfactants capable of achieving a water emulsion in gasoline, known to the prior art, including those surfactants disclosed in my previous application referred to above, the choice is based upon the viscosity of the emulsion produced and the compatability of the surfactants with the electrolyte used.

The electrolyte is preferably chosen from the group of mono-basic alkali metal organic compounds having an alkyl-aryl radical. These compounds are preferably modified by the addition of a base such as sodium hydroxide, to attain an alkaline nature. Other additives, such as dispersants, anti-icers, anti-rust agents and the like may be combined with the emulsion. The dispersants act to prevent agglomeration of the electrolytes, to promote emulsion and to lower the viscosity. The inventive fuel could also be formed by mixing an additive containing the surfactants and electrolyte, and water, with gasoline in a fuel tank.

The increases in fuel economy which result from the vaporized state of the fuel charge and the presence of water vapor in the fuel charge, outweigh the energy consumption of the system in vaporizing the fuel, thus increasing the fuel economy of engines fueled in accordance with the present invention. Additionally, these engines remain exceedingly clean internally and provide an exhaust containing relatively small proportions of atmospheric pollutants.

In one embodiment of the invention, which will subsequently be described in detail, a vaporizer-carburetor receives the liquid electrolytic emulsion, generates the vapor and allows the vapor to be withdrawn into a throat carrying air as a function of the engine manifold pressure. This embodiment includes a solid state sensor positioned to monitor the volume of fluid in the vaporizer and to control the fuel flow to the vaporizer to maintain a relatively constant liquid level.

In another embodiment the automobile accelerator pedal directly controls the current flow through the vaporizer and the vapor fills up a chamber having an outlet to the carburetor throat. Thus the flow of vapor through the orifice into this throat is a function of the accelerator setting. An auxiliary orifice between the vapor chamber and the throat is normally closed and is opened for short periods when the accelerator is suddenly depressed to quickly increase the vapor flow to the engine, in a manner analogous to the acceleration jet in a conventional liquid carburetor.

In still another embodiment a conventional carburetor employing the water-gasoline emulsion is used to start the engine which then runs on the output of the vaporizer.

Other objectives, advantages and applications of the present invention will be made apparent by the following detailed description of a preferred embodiment of the invention. The description makes reference to the accompanying drawings in which:

FIG. 1 is a schematic diagram illustrating a system for fueling an internal combustion engine in accordance with the present invention;

FIG. 2 is a sectional view through a combination fuel vaporizer and carburetor formed in accordance with a preferred embodiment of the invention;

FIG. 3 is a sectional view of the device of FIG. 2 taken along line 3—3 of FIG. 2;

FIG. 4 is a schematic drawing of an alternative form of vaporizer and means for feeding fuel to the vaporizer.

Figure 5:
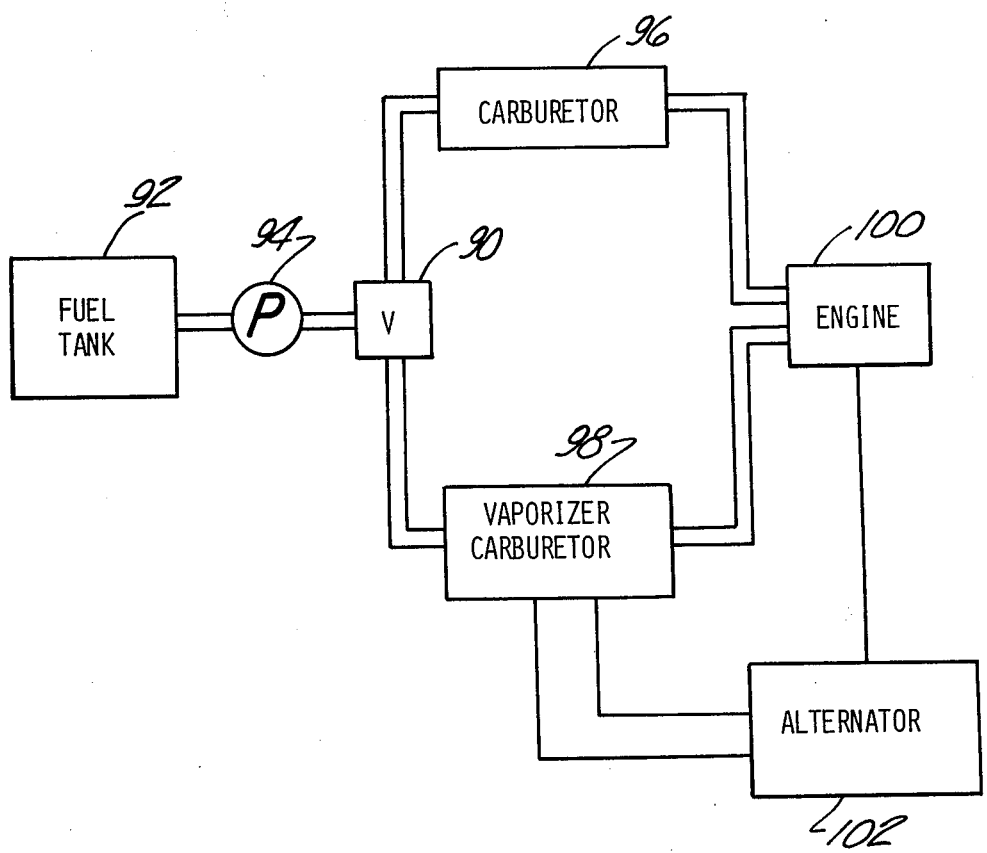
FIG. 5 is a schematic drawing of another alternative embodiment of the invention employing a conventional carburetor for starting the engine.

Fuel systems for internal combustion engines, formed in accordance with the present invention, preferably have the form indicated in FIG. 1. The fuel supply for the engine, stored in the tank 10, broadly comprises a water-gasoline emulsion, containing less than about one-third and more than 2% to 3% by volume of water and having a finite electrical resistance by virtue of the addition of an electrolyte. Specific compositions for such fuel will be subsequently described.

The pump 12, driven by the engine, provides a stream of fluid from the tank 10 to a vaporizer 14. As in conventional automobile engines the pump is preferably of the positive displacement type and produces an output flow proportional to the engine speed.

The vaporizer 14 passes electric current through the fluid provided by the pump to form a vapor. Switch means 16 connect the vaporizer 14 to the output of an inverter 18 powered from the vehicle battery 20 during the starting of the engine. After the engine is running the switch 16 is controlled to provide the vaporizer with power from an alternator 22 driven by the engine.

In the preferred embodiment of the invention the power passed through the fluid fuel is alternating current. In other embodiments of the invention direct current could be used to power the vaporizer. This could be derived directly from the battery 20 or might alternatively employ appropriate voltage changing circuitry. The voltage output of the alterrator 22 is proportional to the engine speed, thus the current passed through the vaporizer 14 and the resultant rate of generation of the vapor is proportional to engine speed. The power from the alternator is derived directly from the alternator field and is not rectified. In a prototype unit a three-phase alternator sold by Ford Motor Company for heating electrically conductive auto windows was used to provide the vaporizing current. This unit has an output from 180–1500 Hz and up to 120 volts as a function of engine speed.

The vapor formed from the fuel is provided to a carburetor 24 which mixes the vapor with incoming air and provides the resulting explosive charge to manifold 26 connecting to the input valves of the engine cylinders 28. The carburetor throttle is controlled by an accelerator 30 which controls the charge flow to the cylinders and thus the speed of the engine.

A preferred embodiment of the combination vaporizer and carburetor is illustrated in FIG. 2. The unit employs three concentric metal tubes 32, 34 and 36, preferably cylindrical in cross-section and formed of a relatively inert metal such as titanium. The inner diameter of the outer tube 32 exceeds the outer diameter of the middle tube 34 and four plastic insulator strips 38 separate the two tubes. Similarly, the inner diameter of the middle tube 34 exceeds the outer diameter of the inner tube 36 and four vertically extending plastic insulator strips 40 separate these two tubes. The outer tube 32 and the inner tube 36 are both welded to a disc-shaped plate 42 at their lower ends so as to support them relative to one another and connect them electrically. The center tube 34 is supported above a plastic ring 44 which insulates the center tube from the inner and outer tubes. The central hole in the disc 42 is the same diameter of the inner tube 36.

In a preferred arrangement the three tubes may each have 0.065 inch thick walls; the outer tube 32 may have an outer diameter of 1.50 inches; the center tube 34 may have an outer diameter of 1.25 inches; and the inner tube 36 may have an outer diameter of 1 inch. Thus the space between the outer tube 32 and the center tube 34 and the space between the center tube 34 and the inner tube 36 are each about 0.185 inches. These tubes, with the base, form two cylindrical volumes, closed at their lower ends and open at their top ends. In the preferred embodiment of the invention the center tube is slightly shorter than the outer tube and the inner tube is slightly shorter than the center tube. This arrangement simplifies the attachment of electrical leads 48 and 46 to the outer and central tubes respectively.

The fuel feed line 50 from the pump 12 is connected to an aperture in the outer tube 32 slightly above the bottom of that tube. Liquid fuel is admitted through this tube into the volume between the inner and outer tubes. Four holes 52 are formed through the center tube 34 at the level of the fuel feed tube 50 allowing fuel admitted through the line 50 to pass to the volume between the inner and middle tubes.

When a potential difference is applied to the two lines 48 and 46, which connect to the switch means in the circuit of FIG. 1, a potential difference is created between the center tube 34 and the inner and outer tubes 32 and 36. Because of the electrolytic nature of the liquid fuel the current that flows will be a function of the instantaneous voltage imposed between the plates and the conductivity of the fuel. When the output of a conventional automotive alternator, of the type used with a 12 volt electric system, is applied to the leads 46 and 48, the electric current causes the liquid fuel to vaporize and to fill the volume between the tubes, above the fluid level.

The narrow cross-sections of the volumes between the tubes act in the manner of capillary tubes to raise the fluid level at the free fluid surfaces between the spacers 38 and 40. The primary current flow through the fluid is at this surface, resulting in a vaporizing of the fluid without a heating of the bulk of the fluid.

The space between the tubes is minimized to prevent the formation of bubbles which might burst to wet and thereby condense already generated vapor thereby diminishing the total productivity of the vaporizer. Additionally, if the space between the tubes is too wide, the bulk of the liquid between the electrodes is heated, unnecessarily wasting power. Additionally, the greater the spacing between the electrodes the greater concentration of electrolyte required. This increases the possibility that heavy current flow through a localized concentration of the electrolyte will create sparking and an explosion within the vaporizer.

The rate of generation of the vapor is a function of the alternator voltage. Vaporization occurs because of the heating of the fluid ($I^2R$ loss) and the electrolytic decomposition of the components of the emulsion, which generate hydrogen and oxygen.

The vapor produced by the apparatus of FIG. 2 is not steam-like in appearance but is rather exceedingly dry to the touch and has little tendency to condense within the normal range of temperatures encountered in driving in this country.

The center of the inner tube 36 acts like the throat of a carburetor. It is equipped with a pivotable choke valve 54, preferably controlled by a conventional automatic choke mechanism. A plastic air intake tube 56 is connected to the bottom of the tube 36 and a conventional air filter 58 closes off the bottom of the tube 56.

At the upper end of the vaporizer a plastic output tube 60 is attached to the outer diameter of the tube 32. A butterfly throttle valve 62 is supported centrally in the tube 60 above the vaporizer structure. The tube 60 leads to the intake manifold of the engine.

To start the engine the switch 16 is connected to the inverter 18 so that alternating current derived from the battery 20 may be used to generate initial vapor for starting. The inverter may provide about 50 volts at 2,000 cycles. Simultaneously the engine is turned over by a conventional starter motor, feeding fuel from the pump 12 through the line 50 into the base of the vaporizer 14. The manifold vacuum will tend to draw this vapor into the combustion chambers to start the engine. Once the engine is started the switch 16 may be thrown to its run position so that the unrectified output of the alternator is applied directly to the vaporizer. In this manner the output of the vaporizer and the rate of generation of vapor will both be a function of the engine speed. The vaporizer may be powered at all times since, in the absence of fuel, no current flows through the vaporizer and accordingly no electrical energy is spent. The flow of air through the interior of the tube 36 as a result of the engine vacuum will draw the vapor into the combustion chamber at a rate proportional to the engine speed. The air/fuel ratio will be a function of the rate of vapor generation and the diameter of the inner tube 36. The diameters of the tubes 32, 34 and 36, and in particular the inner diameter of the inner tube 36, may be varied in other embodiments of the invention to achieve different air/fuel ratios. Alternatively, the output of the air tube 60 might be provided to an additional carburetor device, which mixes the overly rich vapor derived therefrom with additional air to produce the desired air/fuel ratio.

An alternate form of vaporizer is illustrated in FIG. 4. The vaporizer employs a pair of metal plates 64, which are disposed parallel to one another and separated by approximately 1/16 of an inch by plastic spacers 65 therebetween. The plates are supported relative to one another and enclosed at their free ends, by a plastic housing 66, shown broken away for purposes of illustration, which surrounds the outer sides of the plates and encloses the volume between them. Liquid fuel to be vaporized is introduced to the space between the plates by a feedline 68 that extends through the side casing 66 adjacent to the bottom of one side wall. The fuel is driven through the feedline 68 by an electric fuel pump 70 connected by an input line 71 to a fuel supply.

A liquid level sensor 72 extends into the volume between the plates 64 through the sidewall 66, about halfway up its height. The sensor may take any one of a variety of forms. It might be a solid-state sensor or it might employ a float or other well-known technique. The electrolyte in the gasoline allows the use of a conductive liquid level sensors which could not be employed with conventional gasoline fuel. The sensor 72 is connected to the pump 70 and controls the application of power to the pump to maintain a constant level of liquid fuel volume between the plates 64.

The plates 64 are connected to a suitable electric power source by a pair of electric wires 74. The power source may be the devices indicated in FIG. 1 or an appropriate source of DC power.

The vapor generated between the plates 64 as a result of passage of electric current through the fluid fuel accumulates in the volume above the fluid interface and the pressure of the vapor forces it through a line 76 to an appropriate carburetor mechanism, generally indicated at 78, which mixes the vapor with air for feeding to the engine combustion chambers.

The volume between the plates 64 and above the free level of the fluid fuel is also connected to the carburetor 78 by a separate second conduit 80. A normally closed valve 82 supported in the conduit may be opened by an appropriate mechanical or electronic control signal from the acclerator 84 upon sudden depression of the accelerator to instantaneously increase the rate of flow of the vapor into the combustion chamber. This acts in a manner analogous to the acceleration jet of liquid fuel carburetors.

While the preferred embodiment of the invention utilizes the forms of vaporizers shown it should be recognized that other forms of vaporizers may be used with other embodiments of the invention.

An alternate embodiment of the invention which eliminates the need for an inverter to power the vaporizer during the start of the engine is illustrated in FIG. 5. A valve 90 diverts fuel provided from a tank 92 by a pump 94, to either a conventional form of carburetor 96 or to a vaporizer/carburetor 98 formed in accordance with the present invention. An engine 100 is adapted to receive fuel from either the carburetor 96 or the vaporizer/carburetor 98. The engine in turn drives an alternator 102 which provides power to the vaporizer/carburetor 98.

During starting of the engine the valve 90 is controlled to provide fuel to the carburetor 96 and the engine is started in a normal manner. After starting, the valve 90 is switched to provide fuel to the vaporizer/carburetor 98 and the engine 100 begins to run on that vapor. I have found that the generation of vapor commences sufficiently rapidly that the discontinuity of fuel supply resulting from the process is not noted.

This arrangement requires a water-hydrocarbon emulsion containing an electrolyte which is suitable for use in a normal carburetor as well as in the vaporizer. The fuel of Example 1, following, has been found to meet this requirement.

The fuel used with the engine basically consists of an electrolytically conductive water-gasoline emulsion. The water is preferably present in percentages by volume of less than about one-third and in excess of 2% to 3% by volume. Approximately 26% water appears to provide optimum engine performance in a conventional automotive engine. The water-gasoline emulsion may be formed in accordance with the teachings of the prior art. For example, my copending patent application Ser. No. 544,145 discloses an emulsion formed using nonionic ethoxylated alkylphenols as the surfactant. However, I have found that when appropriate electrolytes are added to these emulsions the resulting mixture has such a high viscosity as to make it difficult to design an efficient vaporizer. I preferably employ fuels of the following composition in connection with the invention:

EXAMPLE 1

| | |
|---|---|
| .60% | by volume of butyl naphthalene sodium sulfonate (BNS, by Emkay, anionic, modified by sodium hydroxide) |
| .60% | by volume of modified sodium sulfonate (No. 98, by Petrochem, anionic, dispersant) |
| .60% | by volume of alcohol sodium sulfate (Rexowet NF, by Emkay, anionic) |
| .60% | by volume of alkyl terpene (B, by Emkay, non-ionic) |
| 25.60% | by volume of tap water |
| 72.00% | by volume of commercially available gasoline |
| 100.00% | |

The alkyl terpene and the alcohol sodium sulfate form the basic surfactant system for emulsifying the water and the gasoline. These surfactants provide a proper hydrophobic-hydrophilic balance and provide an emulsion having a higher viscosity than the gasoline which is well suited for use with the preferred embodiments of the vaporizer.

The dispersant is commonly employed with surfactant systems and produces a smooth homogeneous emulsion, preventing agglomeration of the components of the emulsion. The modified sodium sulfate is a water solution containing two grams of the sodium sulfate per 100 milliliters of water.

The butyl naphthalene sodium sulfonate acts as an electrolyte. It is modified by the addition of sodium hydroxide to provide a basic Ph. It is a member of the class of organic materials known as the mahogany acids. Other mono-basic sulfonates might be employed with other embodiments of the invention and as a broad class any organic alkaline metal compound that is soluble in the emulsion can be used as an electrolyte.

The volume of tap water in the above formula may be varied from 3% to 33% and the balance of the gasoline adjusted accordingly without varying the other chemical constituents. Any of these fuels provide satisfactory results. Anti-icers, corrosion resistant agents and other additives known to the art may be added as conditions warrant.

To combine the ingredients of the above formula the surfactants are first introduced into the water phase and the gasoline is then added by continuously stirring with an air driven mixing motor at 1,000 r.p.m. for 3–10 minutes. It is important that as little air as possible be entrained in this emulsion as the thicker mass will require higher pressure for pumping and air bubbles cause an intermittent fuel flow.

This emulsion remains stable over long periods with no separation at extremes of temperature and will not freeze if commonly used gasoline de-icers are used.

EXAMPLE 2

| | |
|---|---|
| .60% | by volume of butyl naphthalene potassium sulfonate |
| .60% | by volume of modified potassium sulfonate |
| .60% | by volume of alcohol potassium sulfonate |

-continued

```
 .60% by volume of alkyl terpene
2.80% by volume of butyl ether (Butyl Cellusolve
       by Union Carbide)
2.80% by volume of alkynolamide (Calamide C by
       Pilot Chemical Co.)
1.00% by volume of ethylene oxide condensate
       (Macon 4 by Stepan Chemical Co.)
24.00% by volume of tap water
67.00% by volume of commercially available gasoline
100.00%
```

The butyl ether acts as a solvent to provide the emulsion with a lower viscosity. I have found that the lower the viscosity of the water-fuel emulsion, the more easily the manifold pressure acts to draw the fluid into the vaporizer, without the need for pumping, thereby achieving a flow which varies in direct proportion to the engine demand.

Similarly, the ethylene oxide condensate acts as a thinner and the alkynolamide acts as an emulsifier.

The emulsion is best formed by mixing the chemicals with either the gasoline or the water and then mixing in the other component. That is, if the chemicals are first added to the gasoline, the mixture of the chemicals and gasoline is then added to the water, or vice versa.

The following formula represents an additive intended to be mixed with water and gasoline to form a fuel for use in connection with the present invention.

EXAMPLE 3

```
16.00% by volume of alcohol sodium sulfate (Rexowet
        NF, by Emkay, anionic)
35.00% by volume of alkanolamine, super (Witcamide
        No. 82, by Witco Chemical Company)
20.00% by volume of a solvent emulsifier blend
        (Schercomul F, by Scherer Chemical Company)
25.00% by volume of butyl ether (Butyl Cellusolve,
        by Union Carbide)
 .67% by volume of alkyl terpene (B, by Emkay,
        non-ionic)
 .67% by volume of butyl naphthalene sodium
        sulfonate (BNS, by Emkay, anionic, modified
        by sodium hydroxide)
 .66% by volume of modified sodium sulfonate (No. 98
        by Petrochem, anionic, dispersant)
2.00% by volume of tap water
100.00%
```

10% by volume of this additive is used with 65% by volume of gasoline and 25% by volume of water to form an electrolytic water-gasoline emulsion for use in connection with the present invention.

Having thus described my invention, I claim:

1. A vaporizer-carburetor for use with an electrolytic water-hydrocarbon emulsion comprising: a pair of tubes supported concentrically, the tubes having such dimensions as to define a volume between their adjacent walls; means for filling at least a portion of such volume with an electrolytic water-hydrocarbon emulsion; means for applying a potential difference between the tubes so as to cause current to pass through the emulsion to vaporize the fluid; and means for passing air through the center tube to draw vapor from the space between the tubes and mix it with the air.

* * * * *